United States Patent [19]
Ohkubo et al.

[11] Patent Number: 6,048,104
[45] Date of Patent: Apr. 11, 2000

[54] FERRULE FOR USE IN OPTICAL FIBER CONNECTOR

[75] Inventors: Hajime Ohkubo, Narashino; Yuuji Kakutani, Nasu-gun, both of Japan

[73] Assignee: Seiko Seiki Kabushiki Kaisha, Japan

[21] Appl. No.: 08/708,257

[22] Filed: Sep. 6, 1996

[51] Int. Cl.[7] .................................................. G03B 6/36
[52] U.S. Cl. .................................................. 385/78
[58] Field of Search .................. 385/78–85, 72, 385/60–68

[56] References Cited

U.S. PATENT DOCUMENTS

| | | | |
|---|---|---|---|
| 4,185,883 | 1/1980 | Chown et al. | 385/78 |
| 4,925,266 | 5/1990 | Huebscher et al. | 385/78 |
| 4,988,161 | 1/1991 | Fujikawa et al. | 385/84 |
| 5,323,475 | 6/1994 | Marsden et al. | 385/77 |

FOREIGN PATENT DOCUMENTS

| | | | |
|---|---|---|---|
| 0156397 | 10/1985 | European Pat. Off. | 385/92 |
| 3310973 | 9/1984 | Germany | 385/80 |
| 55-22707 | 2/1980 | Japan | 385/80 |
| 57-161818 | 10/1982 | Japan | 385/80 |

*Primary Examiner*—Hung N. Ngo
*Attorney, Agent, or Firm*—Adams & Wilks

[57] ABSTRACT

A ferrule for use in an optical fiber connector comprises a main body having an insertion hole for receiving an optical fiber element. The insertion hole has a first end for receiving the optical fiber element, a second end, a positioning portion disposed proximate the second end for connection to an outer peripheral surface of the optical fiber element to position the optical fiber element in the insertion hole, and a divergent portion diverging smoothly from the positioning portion to the first end.

24 Claims, 14 Drawing Sheets

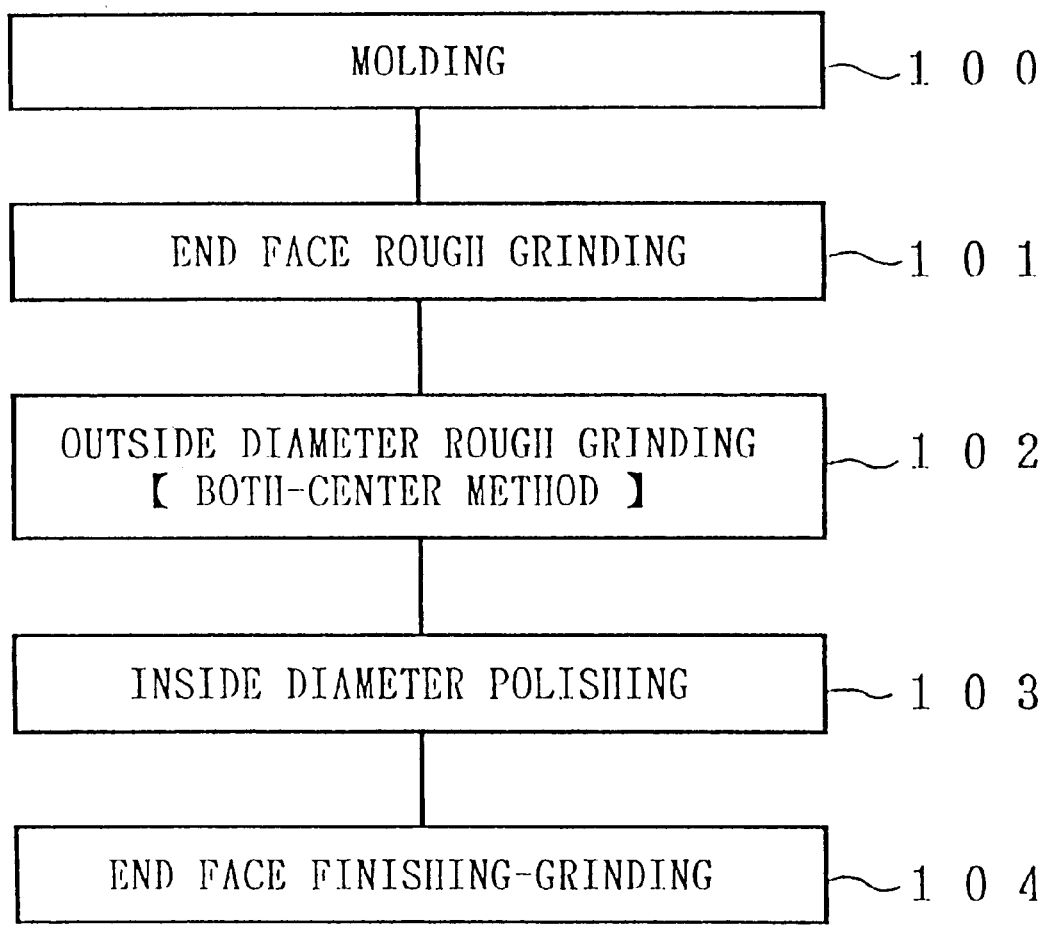

FIG. 9
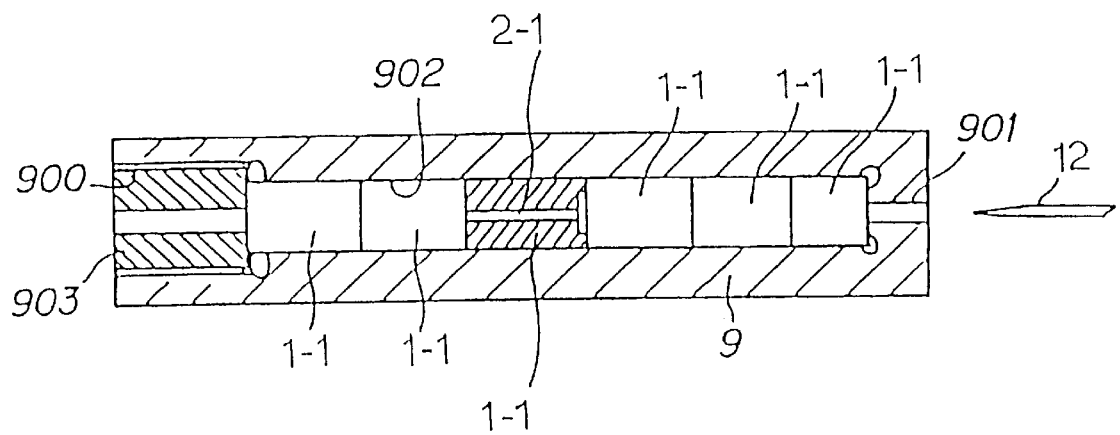
FIG. 10(a)    FIG. 10(b)
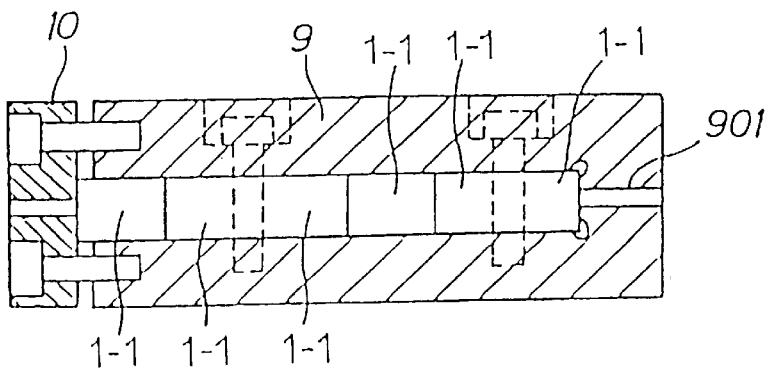    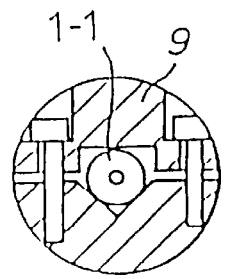

PRIOR ART
FIG. 16 (a)  FIG. 16 (b)  FIG. 16 (c)
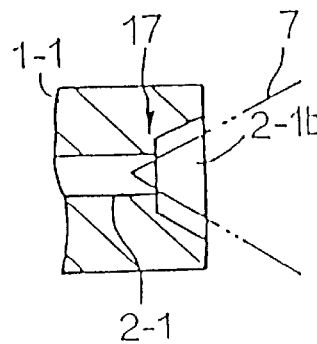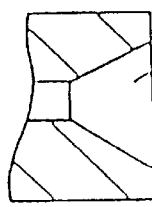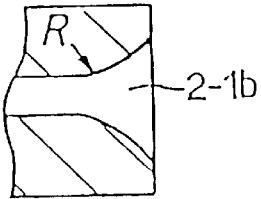
FIG. 17
PRIOR ART
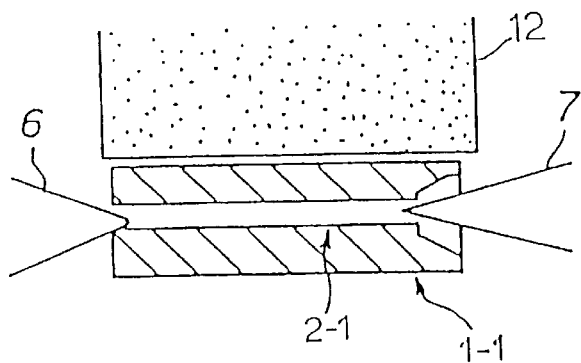

6,048,104

FERRULE FOR USE IN OPTICAL FIBER CONNECTOR

BACKGROUND OF THE INVENTION

The present invention relates to an optical fiber connector, a ferrule for use in the optical fiber connector and a method for manufacturing the same.

Conventionally, as this type of optical fiber connector there is known that which is equipped with a ferrule which has a configuration as illustrated in FIG. 13 and which is prepared by injection molding.

The ferrule illustrated in FIG. 13 is constituted by a main body of the ferrule. In this main body 1 of the ferrule, from the injection molding time an entire fiber insertion hole 2 is provided slenderly in such a way as to have substantially the same diameter as that of an elemental optical fiber. When into this insertion hole 2 the elemental optical fiber is inserted from an inlet thereof, the elemental optical fiber is positioned, fixed, centered and retained by the fiber insertion hole 2 as a whole, whereby the elemental optical fiber is retained precisely.

As manufacturing process steps for manufacturing the ferrule illustrated in the same figure there are known a series of process steps 300 to 306 such as those illustrated in FIG. 14.

In a process step (molding) 300, there is molded as illustrated in FIG. 15(a) by injection molding or the like a ferrule blank 1—1 which becomes a base of the ferrule main body 1 (refer to FIG. 13). This ferrule blank 1—1 is formed cylindrically and is provided with a prepared hole 2-1 for optical fiber insertion in such a way that this prepared hole passes through the blank between both end faces thereof. It is to be noted that the prepared hole 21 is that which becomes a base of the fiber insertion hole 2.

In a process step (inside diameter polishing) 301, from the standpoint of achieving a reduction in the manufacturing time length, a plurality of the ferrule blanks 11, 1—1, - - -, are unified as a set, whereby all the prepared holes 2-1 are polished simultaneously (refer to FIG. 15(b)).

In this inside diameter polishing, an operation of passing a setting wire 13 into the prepared hole 2-1 and thereby setting a plurality of the ferrule blanks 1—1 onto the wire 13, an operation of filling into a cylindrical body (sheath) 15 a setting 14 that consists of a plurality of the ferrule blanks 1—1, 1—1, - - - and charging adhesive 16 such as solder, lac, etc. into this cylindrical body 15 and thereby performing positioning and fixing of the setting 14, and an operation of drawing off the wire 13 from the setting 14 are performed sequentially. Next, a polishing taper wire 12 (whose diameter dimension becomes large in the longitudinal direction and is fixed in the ending half portion) is inserted into the prepared holes 2-1 from the end face side of the cylindrical body 15. Thereafter, with the cylindrical body 15 being rotated about its axis, the taper wire 12 is drawn off therefrom axially and taken up onto a reel not illustrated while scattered abrasive grains 10 are sequentially being supplied and adhered onto the taper wire 12 immediately before the ferrule blank 1—1, to thereby polish the prepared hole 2-1. Supply and adhesion of the scattered abrasive grains 10 are performed such that liquid scattered abrasive grains 10 are applied onto the taper wire 12 or this taper wire 12 is immersed therein.

That is, the inside diameter polishing is performed with respect to the prepared hole which is not machined whatsoever after molding of the ferrule blank.

It is to be noted that after polishing the abrasive 16 is removed and all the ferrule blanks 1—1, 1—1, - - - are taken off from the cylindrical body 15.

In a process step (outside diameter grinding [centerless method]) 302, from the standpoint of removing the outside diameter machining allowance of the ferrule blank 1—1 with a high efficiency, the ferrule blank 1—1 having had its inside diameter polished is set on, for example, a centerless supporting apparatus to thereby grind the outside diameter portion 1-1c of this ferrule blank 1—1 with the use of no center (refer to FIG. 15(c)).

In a process step (end face grinding) 303, rough grinding is executed with respect to the both end faces 1-1a and 1-1b of the ferrule blank 1—1 (refer to FIG. 15(d)).

In a process step (outside diameter grinding [both center method]) 304, from the standpoint of correcting the eccentricity between the outside diameter of the ferrule blank 1—1 and the prepared hole 2-1 and thereby making the both coaxial with each other, an outside diameter portion 1-1c of the ferrule blank 1—1 is ground as illustrated in FIG. 15(e). In this outside grinding, the ferrule blank 11 is supported with one center being at each end face. This both center supporting is performed by causing center jigs 6 and 7 to abut from the both end face sides 1-1a and 1-1b of the ferrule blank 1—1 onto the prepared hole 2-1 and thereby causing the ferrule blank 1—1 to be supported from the both end face sides 1-1a and 1-1b.

In a process step (outside diameter polishing) 305, the outside portion 1-1c of the ferrule blank 1—1 is polished to be finished to a desired roughness (refer to FIG. 15(f)).

In a process step (end face machining) 306, machining such as machining of the end face of the ferrule blank 1—1 into a convex spherical surface is performed (refer to FIG. 15(g)).

The following is to be noted. In the process step (molding) 300, as illustrated in FIG. 16(a), at a time of injection molding of the ferrule blank 1—1, a stepped portion 17 is provided with respect to an inlet 2-1b of the prepared hole 2-1. As illustrated in FIG. 17, this stepped portion 17 is used temporarily as an abutment basis for the center jig 7 when performing the outside diameter grinding that is to be performed with the use of the grinder 12 in the succeeding step (outside diameter grinding [both center method]) 304. Accordingly, after the performance of the outside diameter grinding, from the standpoint of preventing flawing of the elemental optical fiber by the stepped portion 17, chamfering (refer to FIG. 16(b)), circular-arc configuration chamfering (refer to FIG. 16(c)) or the like is performed with respect to the prepared hole inlet 2-1b to thereby shave off the stepped portion 17 and thereby finish the prepared hole inlet 2-1b, i.e. fiber insertion hole 2 inlet into the configuration of a smooth bowl that has no angular portion.

On the other hand, the ferrule illustrated in FIG. 18 is that which has been constructed from the standpoint of reducing the amount of the fiber insertion hole 2 finish-machined with it in mind that at even only a large-depth portion (one end side) 2a of the fiber insertion hole 2 alone it is possible to perform positioning, fixing, centering and retention (precise retention) of the Elemental optical fiber sufficiently.

That is, in this ferrule, from the injection molding time, only the large-depth portion (one end side) 2a of the fiber insertion hole 2 is formed to a diameter that is substantially the same as that of the elemental optical fiber and the remaining portion thereof is formed to a diameter that is sufficiently larger than the diameter of the elemental optical fiber. When inserting the elemental optical fiber into this fiber insertion hole 2, the elemental optical fiber is positioned, fixed, centered and retained not by the whole fiber insertion hole 2 but by only the large-depth portion (one end side) alone.

However, the above-mentioned conventional ferrule has the following problems.

In the conventional ferrule that is illustrated in FIG. 13, since it is of a structure wherein positioning and fixing of the elemental optical fiber are performed by the entire fiber insertion hole 2, it becomes necessary to perform finish machining for positioning and fixing thereof with respect to the entire fiber insertion hole 2, with the result that the amount of the fiber insertion hole machined and the amount of machining time become large. This is followed by an increase in the length of time for manufacturing the ferrule, which results in that a longer period of time is needed for completion of manufacture of the optical fiber connector.

In addition, according to the conventional ferrule illustrated in this figure, the fiber insertion hole 2 is slender and an elongate small-diameter hole, and therefore at the injection molding time curving of the fiber insertion hole 2 occurs, with the result that a step for correcting this curving becomes additionally needed separately. Further, from the standpoint of preventing flawing of the elemental optical fiber, it is necessary to perform a secondary machining such as chamfering, circular-arc configuration chamfering with respect to the inlet of the fiber insertion hole 2. Therefore, in this respect also, the manufacturing process steps for manufacturing the optical fiber connector increase in number, with the result that a larger amount of time is needed for completion of the manufacture thereof, which results in an increase in the manufacturing cost.

In the conventional ferrule illustrated in FIG. 18, as illustrated in FIG. 19, at the time of grinding the outside diameter the contact of the center jig 7 with the other end 2b of the fiber insertion hole 2 is unstable. The reason for this is that since the other end 2b of the fiber insertion hole 2 that is abutted against by the center jig 7 is as is immediately after having been injection molded, the contour thereof has a number of concavities and convexities and therefore the hole precision at the other end 2b of the fiber insertion hole is low. This causes deterioration in the precision of the outside diameter grinding (the circularity of the outside diameter of the ferrule, the coaxiality of the outside diameter of the ferrule and the fiber insertion hole, etc.), which results in that it is not possible to obtain a highly precise optical fiber connector.

It is to be noted that in order to avoid such inconvenience, it can be also considered to perform a so-called "center-hole machining" of, before the performance of the outside diameter grinding, finishing the other end 2b of the fiber insertion hole to a prescribed dimensional precision. However, separate addition of this center hole machining causes additional increase in the number of the manufacturing process steps for manufacturing the optical fiber connector, with the result that a larger amount of time is needed for completion of the manufacture thereof, which results in an increase in the manufacturing cost.

Also, according to the conventional ferrule illustrated in FIG. 18, a stepped portion 18 exists at a large-depth portion side due to the difference in diameter between the large-depth side of the fiber insertion hole 2 and the remaining portion thereof. For this reason, when performing injection molding, blow holes occur in the stepped portion 18 and the portion in the vicinity thereof due to a rapid change in the sectional area involved therein, with the result that the positioning portion (the large-depth portion [one end 2a side] of the fiber insertion hole 2) located forwardly from the stepped portion 18 cannot be finished into a desired configuration. Therefore, the positioning, fixing, centering and retaining precision for the elemental optical fiber is inferior. For this reason, a high precision optical fiber connector cannot be obtained, which is accompanied by a decrease in the reliability of the optical communication. Also, burrs also are likely to occur in the stepped portion and these burrs cause damage to the elemental optical fiber. In this respect also, it is possible neither to obtain a high precision optical fiber connector nor to expect a highly reliable optical communication.

The above-mentioned ferrule manufacturing method has the following problems.

(1) In the conventional manufacturing process, as illustrated in FIG. 15(b), since the positioning and fixing of the ferrule blank 1—1 in the process step (inside diameter polishing) 301 are performed with the use of the adhesive 16, the operation of charging and setting the adhesive 16 that is to be performed as a preceding tooling for the performance of the inside diameter polishing and the operation of removing the adhesive 6 that is to be performed as a succeeding tooling are needed and in addition these operations must be performed by man power. Therefore, a larger amount of time is spent for performance of these tooling operations, which results in that the entire ferrule manufacturing time length increases. Therefore, a larger amount of time for completion of manufacture of the optical fiber connector is needed. On the other hand, full automation of the manufacturing process steps therefor is difficult.

Furthermore, in the above-mentioned polishing and fixing that are performed using the adhesive 16, the set condition of the ferrule blank 1—1 collapses due to shrinkage and the like of the adhesive 16, with the result that the ferrule blank 1—1 and prepared hole 2-1 are disadvantageously inclined with respect to the cylindrical body 15. In consequence, the setting precision decreases with the result that the matching conditions for performance of the inside diameter polishing deteriorates. For this reason, no desired machining precision is obtained. Further, the use of the adhesive 16 results in the collapse of the set condition as mentioned above and hence in the inferior balance of the cylindrical body 15 as a whole. Therefore, the high-speed rotation of the cylindrical body 15 is impossible to perform and the machining efficiency is impossible to increase.

(2) In the conventional manufacturing process, because the eccentricity and parallelism degrees between the prepared hole 2-1 formed by molding and the outside diameter of the ferrule blank are not those which are desired and because the inside diameter polishing that is to be performed in the process step 301 is performed with respect to the prepared hole 2-1 that is not machined whatsoever after molding and therefore the inside diameter polishing is performed independently of the outside diameter of the ferrule blank, after the inside diameter polishing no correction is made of the eccentricity and parallelism degrees between the prepared hole 2-1 and the outside diameter of the ferrule blank, with the result that the eccentric or inclined prepared hole 2-1 spreads as it is. For this reason, the outside diameter machining allowance of the ferrule blank 1—3 must be made unnecessarily large, with not only the eccentricity and inclination resulting from errors in the molding in the process step 300 but also the spread of the eccentric and inclined prepared hole 2-1 in estimation. As a result, a larger amount of time is needed for removal of such unnecessary machining allowance, which causes an increase in the total ferrule manufacturing time length, which necessitates the use of a larger amount of time for completion of the manufacture of the optical fiber connector. Also, an amount of molding material of the ferrule blank 1—3 that is larger by that extent becomes necessary. This causes an increase in the manufacturing cost of the optical fiber. Further, after the performance of the inside diameter polishing, the additional necessity arises of providing the process step 304 for removal of the above-mentioned inclination and eccentricity.

(3) According to the conventional manufacturing process, in the case where the outside diameter machining allowance of the ferrule blank 1—3 is large and in addition the both center supporting in the process step 304 is adopted as mentioned above, since the centering jig is small in thickness because of the prepared hole 2-1 being small in diameter, the machining efficiency is low. Therefore, the process step of removing the outside diameter machining allowance with a high efficiency becomes needed separately. In this sense, the outside diameter grinding that uses the centerless method, which provides an excellent machining efficiency, is adopted as the process step 302 between the process steps 301 and 304. However, since the centerless method is inferior in the ability of smallening the eccentricity, it is needed to set an air cut that corresponds to the eccentricity when machining in the process step 304 is performed. Therefore, the amount of machining time in the process step 304 cannot be largely shortened, with the result that the entire ferrule manufacturing time length is not shortened.

It is to be noted that although in order to correct the eccentricity of the prepared hole 2-1 it can be also considered to apply in the process step 302 the outside diameter grinding that uses the wire centerless method instead of the one which uses the centerless method, the adoption of such wire centerless method results in that a large amount of time is needed for the performance of the tooling operation such as the operation of setting the ferrule blank 1—3 on the wire. On the other hand, omitting the use of man power is difficult and therefore a rise in the manufacturing cost is unavoidable.

(4) In the conventional manufacturing process, when the prepared hole is of a configuration whose forward end is small in diameter such as a nozzle as illustrated in FIG. 18, due to the variation in the diameter of the prepared hole the ferrule blank 1—3 is inconveniently set in the process step 301 while being inclined with respect to the setting wire 13 as illustrated in FIG. 20, with the result that difficulties arise in setting the ferrule blank 1—3 with a high precision in parallel with the wire 13. As a result, the machining precision becomes more seriously deteriorated.

SUMMARY OF THE INVENTION

The present invention has been made under the above-mentioned circumstances and a first object (1) thereof is to provide an optical fiber connector which is suitable for achieving the enhancement of the optical fiber connector precision, the simplification of the manufacturing process steps therefor, etc., a second object (2) thereof is to provide a ferrule which is suitable for achieving the enhancement of the reliability of the optical communication, the simplification of the manufacturing process steps for manufacturing the ferrule, the reduction in the manufacturing time length for manufacturing the ferrule, et., a third object (3) thereof is to provide a ferrule manufacturing method which is suitable for achieving the reduction in the manufacturing time length for the ferrule, full automation of the ferrule manufacturing process steps, the enhancement of the machining precision, etc., particularly to provide a manufacturing method which is effective for the enhancement of the parallelism degree and eccentricity precision of the prepared hole having had its inside diameter polished as measured with respect to the outside diameter of the ferrule blank (refer to FIG. 8), and a fourth and final object (4) thereof is to provide a ferrule manufacturing method which is suitable for achieving the reduction in the cost of the ferrule, the reduction in the manufacturing time length therefor, etc.

In order to attain the above objects, firstly, the present invention provides an optical fiber connector which is provided with a ferrule main body for centering and retaining a terminal end portion of an elemental optical fiber and which is characterized in that the ferrule main body is provided with a fiber insertion hole having one end consisting of a retention hole whose diameter can retain an outer-peripheral surface of the elemental optical fiber and the other end consisting of an enlarged-diameter portion whose diameter is larger than that of the retention hole and which connects to the retention hole, and an inner wall of the other end of the fiber insertion hole has formed thereon a plurality of protruding portions that constitute abutment basis for a center jig which is used when the outside diameter grinding of the ferrule main body is performed.

Secondly, the present invention provides an optical fiber connector which is characterized in that a surface configuration of the protruding portion is in the form of a curved surface.

Thirdly, the present invention provides a ferrule for use in an optical fiber connector which is provided with a fiber insertion hole for insertion of an optical fiber in a main body of the ferrule and which is characterized in that a large-depth portion side of the fiber insertion hole is formed as a small-diameter positioning portion that is made to cohere onto an outer-peripheral surface of the optical fiber and an inlet side of the fiber insertion hole is provided as a divergent portion that smoothly diverges from the positioning portion.

Fourthly, the present invention is characterized by comprising the steps of using a circular-columnar ferrule blank whose prepared hole for insertion of the optical fiber passes therethrough between end faces thereof, performing the outside diameter rough grinding of the ferrule blank to thereby zero an eccentricity between the outside diameter of the ferrule blank and the prepared hole thereof, thereafter causing a plurality of eccentricity-removed ferrule blank to abut against a cylindrical type holder and performing positioning and fixing thereof in a vertical row, and thereafter inserting scatter abrasive grains from an end face side of the cylindrical type holder into the prepared hole of the eccentricity-removed ferrule blank to thereby polish the prepared hole.

Fifthly, the present invention is characterized by comprising the steps of using a circular-columnar ferrule blank whose prepared hole for insertion of the optical fiber passes therethrough between end faces thereof, performing the outside diameter rough grinding of the ferrule blank by a both-center supporting method that comprising causing a center jig to abut from both end face sides of the ferrule blank against a prepared hole thereof and supporting the ferrule blank with the center jig from the both end face sides to thereby an eccentricity and inclination between the outside diameter of the ferrule blank and the prepared hole thereof, thereafter polishing the prepared hole of the ferrule blank by using the outside diameter of the ferrule blank as a basis, and thereafter performing the outside diameter finish grinding of the ferrule blank by the both-center supporting method that comprising causing the center jig to abut from the both end face sides of the ferrule blank against the prepared hole thereof and supporting the ferrule blank with the center jig from the both end face sides.

Sixthly, the present invention is characterized by comprising the step of performing the end face rough grinding of the ferrule blank before performing the outside diameter rough grinding.

Seventhly, the present invention is characterized by comprising the step of performing the end face finish grinding of the ferrule blank after performing the outside diameter finish grinding.

And eighthly, the present invention is characterized by comprising the step of performing the end face rough grinding and end face finish grinding of the ferrule blank before performing the outside diameter rough grinding or after performing the outside diameter finish grinding.

In the present invention, when performing the outside diameter grinding of the ferrule main body, the center jig abuts not against the hole inlet which is as is immediately after the injection molding and whose contour concavities and convexities but against the convex portions that serve as abutment bases. That is, even if no machining is performed of the ferrule that is between after the injection molding and before the outside diameter grinding, the 3-point contact of the center jig is reliably obtained through the abutment between the center jig and the convex portions.

In the present invention, since the portion of the fiber insertion hole that covers from the positioning portion to the inlet side thereof diverges smoothly as the divergent portion, at a time of, for example, injection molding of the ferrule main body blow holes or burrs are less likely to occur in the fiber insertion hole. Therefore, it does not happen that the optical fiber is flawed by such burrs. Therefore, secondary machinings for preventing the occurrence of the flaws can be omitted. Thus, it is possible to insert the elemental optical fiber into the fiber insertion hole without performing secondary machinings with respect thereto.

In the present invention, a plurality of eccentricity-removed ferrule blanks are positioned and fixed using the outside diameter thereof as a basis through the abutment thereof against the cylindrical type holder, whereby the prepared hole is polished using the outside diameter of the ferrule as a machining basis.

In the present invention, prior to the polishing of the prepared hole the eccentricity and inclination between the outside diameter of the ferrule blank and the prepared hole thereof are zeroed beforehand by the outside diameter grinding. For this reason, when providing the outside diameter machining allowance of the ferrule blank, it is only needed to take into consideration the eccentricity and inclination that results from molding errors that occur at a stage of molding the ferrule blank. This enables miniaturization of the machining allowance of the outside diameter of the ferrule blank.

BRIEF DESCRIPTION OF THE DRAWINGS

FIG. 7 is a flow chart illustrating an embodiment form of a ferrule manufacturing method according to the present invention.

FIG. 9 is a sectional view of a cylindrical type holder that is used in the ferrule manufacturing method illustrated in FIG. 7.

FIG. 10(a) and 10(b) are sectional views illustrating another embodiment form of the cylindrical type holder.

FIGS. 16(a)–16(c) are views illustrating the conventional ferrule manufacturing method.

FIG. 17 is views illustrating the conventional ferrule manufacturing method.

DETAILED DESCRIPTION OF THE PREFERRED EMBODIMENTS

Embodiment forms of the present invention will now be described in detail with reference to FIGS. 1 to 12.

An optical fiber connector is equipped with means for centering and retaining a terminal end portion of an elemental optical fiber.

Figures 1A, 1B:
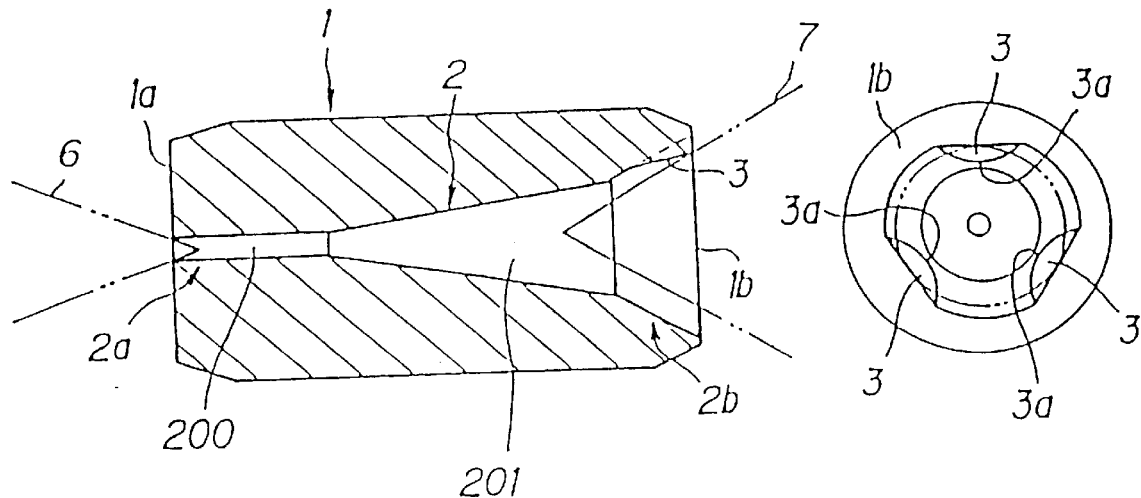
FIG. 1(a) and 1(b) are sectional view, respectively and a side view, respectively of an embodiment form of the present invention.

The ferrule is composed of a main body 1 thereof which has a configuration such as that illustrated in FIGS. 1(a)–1(b) and the ferrule main body 1 is provided with a fiber insertion hole 2 for centering and retaining a terminal end portion of the elemental optical fiber (not illustrated).

One end 2a side of the fiber insertion hole 2 is formed as a small-diameter retention hole 200 and a portion thereof from the retention hole 200 to an other-end 2b side of the fiber insertion hole 2 is formed as an enlarged-diameter portion 201 whose diameter is larger than that of the retention hole 200.

The retention hole 200 is so constructed as to cohere onto an outer-peripheral surface of the elemental optical fiber and retain this outer-peripheral surface thereof through this coherence while, on the other hand, the enlarged-diameter portion 201 consists of a divergent taper hole that smoothly diverges from the retention hole 200 toward the other-end 2b side of the fiber insertion hole 2.

That is, the retention hole 200 is made to have a diameter capable of retaining the outer-peripheral surface of the elemental optical fiber. On the other hand, the enlarged-diameter portion 201 is formed so that it may gradually increase in diameter from a boundary between itself and the retention hole 200 toward the other-end 2b side of the fiber insertion hole 2 and become maximum in diameter on its insertion-hole other-end 2b side.

The other-end 2b of the fiber insertion hole 2 is made open like a bowl and is provided on its inner wall with three protruding portions 3, 3 and 3 along the wall surface. As shown in FIG. 1(b), each of these protruding portions 3, 3 and 3 is so provided that it may have its surface formed in the shape of a curved surface and its apex portions 3a, 3a and 3a may be directed toward a center axis of the fiber insertion hole 2.

The protruding portions 3, 3 and 3 are used as abutment bases for a center jig 7 when performing the outside diameter grinding of the ferrule main body 1 after injection molding thereof. How these protruding portions 3, 3 and 3 act when performing the outside diameter grinding will be described later.

In this ferrule, when a terminal end portion of the elemental optical fiber is inserted into the fiber insertion hole 2 from the other-end 2b side, the elemental optical fiber coheres onto the retention hole 200 and is thereby centered, retained, positioned and fixed through this coherence, whereby the terminal end portion of the elemental optical fiber is retained with a high precision.

Figure 2:
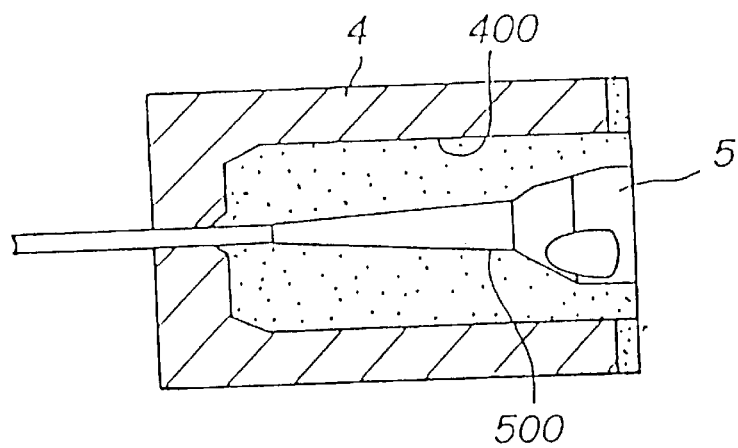
FIG. 2 is a view illustrating a method for manufacturing a ferrule illustrated in FIG. 1.

To manufacture the ferrule having the above-mentioned construction, a die 4 and a core pin 5 such as those illustrated in FIG. 2 are used.

The die 4 is provided with a cavity 400 for forming the contour of the ferrule main body 1 while, on the other hand, the core pin 5 is formed with an insertion-hole configuration portion 5 having substantially the same configuration as that of the fiber insertion hole 2.

When manufacturing the ferrule main body 1 by using the die 4 and core pin 5, the core pin 5 is inserted into the cavity 400 of the die 4, and the insertion hole configuration portion 500 of the core pin 5 is positioned and fixed at a predetermined position within the cavity 400. Thereafter, the ferrule base material is injected and filled in the cavity 400 to thereby perform injection molding of the ferrule main body 1.

Thereafter, as illustrated in FIG. 1, outside diameter grinding is performed with respect to the ferrule main body 1 from the standpoint of zeroing the eccentricity between the outside diameter of the ferrule main body 1 and the fiber insertion hole 2 and thereby making the both coaxial with each other.

At this time, the ferrule main body 1 is supported by the both-center supporting method. The both-center supporting method is one wherein the ferrule main body 1 is supported by a pair of right/left center jigs 6 and 7 from the both end faces 1a/1b sides.

When performing this both-center supporting method, inserting the center jigs into the fiber insertion hole 2 from the both end faces 1a/1b sides of the ferrule main body 1 permits the left side center jig 6 to abut against one end 2a of the fiber insertion hole 2 and permits the right side center jig 7 to abut against the protruding portions 3, 3 and 3 on the other-end 2b side of the fiber insertion hole 2.

That is, the right-side center jig 7 contacts with the other-end 2b side of the fiber insertion hole 2 at a zone that is circumferential of the right side center jig 7 through the convex portions 3, 3 and 3.

Then, after having completed the outside diameter grinding that is per armed by the above-mentioned both-center supporting method, the ferrule as a final product is obtained by performing the other machinings such as polishing of the fiber insertion hole 2.

According to the ferrule in the present embodiment form, the three protruding portions 3, 3 and 3 are provided on the inner wall of the other end of the fiber insertion hole 2 and these protruding portions are used as the abutment bases for the center jig 7 when performing the outside diameter grinding of the ferrule main body 1. For this reason, when performing the outside diameter grinding of the ferrule main body 1, the center jig 7 abuts not against the inlet of the hole which is as is immediately after the injection molding and whose contour has concavities and convexities but against the protruding portions 3, 3 and 3 that constitute the abutment portions. As a result, the state of contact of the center jig 7 becomes stabilized, and therefore the outside diameter grinding precision (the circularity of the outside diameter of the ferrule, the coaxiality between the outside diameter of the ferrule and the fiber insertion hole, etc.) increases. Therefore, the increase in the ferrule precision can be achieved, whereupon a high precision optical fiber connector is obtained.

Also, according to this ferrule, even when no machining is performed with respect to the ferrule main body 1 that is between after injection molding thereof and before the outside diameter grinding thereof, the 3-point contact of the center jig 7 is reliably obtained through the abutment between the center jig 7 and the protruding portions 3, 3 and 3. Therefore, it is not necessary to finish before the performance of the outside diameter grinding the other end 2b of the fiber insertion hole 2 to a prescribed dimensional precision and therefore it is possible to omit the machining of the center hole for finishing of this other end 2b, with the result that the ferrule manufacturing process steps decrease in number by that extent. In this respect, it is possible to achieve the simplification of the manufacturing process steps for manufacturing the optical fiber connector and the reduction in the manufacturing cost therefor.

Especially, in this ferrule, since the protruding portions 3, 3 and 3 are spherically surfaced, even when the protruding portions 3, 3 and 3 are made to remain as are, the elemental optical fiber is prevented from being flawed later by the protruding portions 3, 3 and 3, with the result that it is possible to omit totally secondary machinings for achieving the prevention of flawing such as conventional chamfering, circular-arc configuration chamfering or the like. In this respect also, the simplification of the manufacturing process steps and the reduction in the manufacturing cost can be achieved.

Further, according to this ferrule, since the contact between the center jig 7 and the other-end 2b side of the fiber insertion hole 2 is in the form of the 3-point contact and therefore the contact resistance is low, it is possible to increase the amount of the outside diameter ground and shaved off when performing the outside diameter grinding and also to improve the machining efficiency as well.

It is to be noted that regarding the number of the contact points between the center jig 7 and the other-end 2b side of the fiber insertion hole 2 the 3-point contact method that uses the three protruding portions 3, 3 and 3 is adopted from the standpoint of the stability of the contact, etc. Accordingly, only if a stable contact can be obtained, it is also possible to increase the number of the protruding portions 3, 3 and 3 up to more than 3 and thereby contact the center jig 7 with the other-end 2b side of the fiber insertion hole 2 at more than 3 points. That is, the number of the protruding portions can be changed suitably.

Figure 3A:
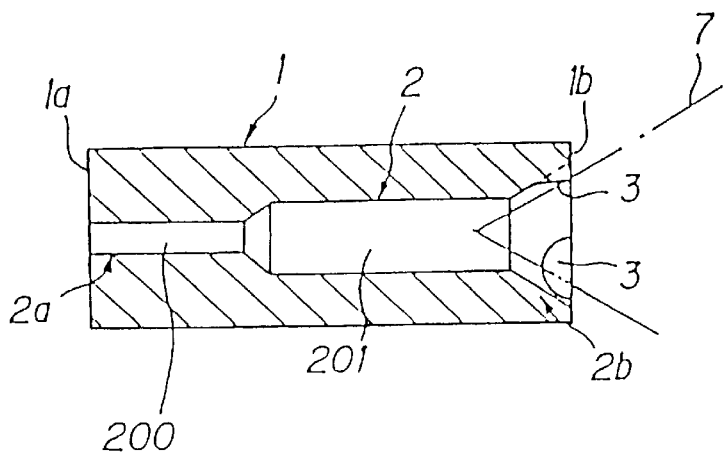
FIG. 3(a) and 3(b) are a sectional view and a side view, respectively of another embodiment form of the present invention.
Figure 3B:
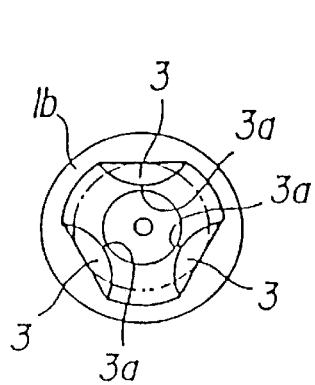

As illustrated in FIGS. 3(a)–3(b), the enlarged-diameter portion 201 can be also formed in place of a taper hole into a hole whose diameter is the same from the retention hole 200 to the other-end 2b side of the fiber insertion hole 2.

The configuration of the protruding portions 3, 3 and 3 which enables the procurement of the point contacts between the protruding portions 3, 3 and 3 and the center jig 7 as viewed circumferentially thereof can be adopted and therefore is not limited to a curved surface configuration, provided, however, that configuration should be made to be one which enables draw-off of the core pin 5 when performing injection molding. Also, the protruding portions 3, 3 and 3 may be removed after completion of the outside diameter grinding.

Figure 4:
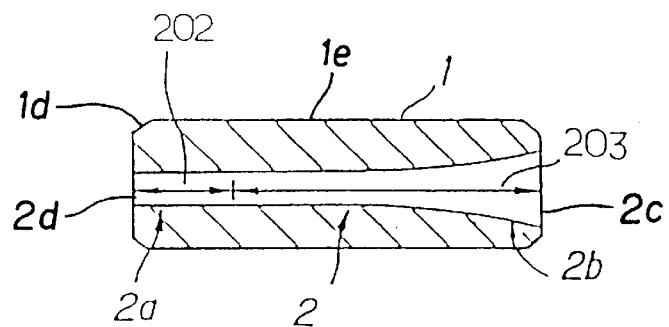
FIG. 4 is a sectional view illustrating an embodiment form of a ferrule according to the present invention.

FIG. 4 illustrates an embodiment of the ferrule according to the present invention. The ferrule illustrated in this figure is composed of the ferrule main body 1 having a first end portion defining a peripheral flange 1c, a second end portion defining a peripheral flange 1d, a generally cylindrical outer peripheral surface 1e extending from the first end portion 1c to the second end portion 1d, and to a central through-hole defining a fiber insertion hole 2 having a first open end for receiving an elemental optical fiber (not illustrated) therethrough and a second open end.

A first section or large-depth portion side 2a of the fiber insertion hole 2 is provided as a positioning portion 202 constituted by a small-diameter hole and a second section or side 2b thereof is provided as a divergent portion 203. The positioning portion 202 coheres onto the outer-peripheral surface of the elemental optical fiber as in the case of the retention hole 200 (refer to FIG. 1) and, through this coherence, effects positioning and fixing of the elemental optical fiber. On the other hand, the divergent portion 203 is formed such that it smoothly diverges from the positioning portion 202 toward the inlet side 2b of the fiber insertion hole 2 and the divergence thereof is made to be in a curvilinear form that is large in curvature. In this embodiment, the second section 2b extends along a greater length of the fiber insertion hole 2 than the first section 2a.

That is, the positioning portion 202 is formed having substantially the same diameter as that of the elemental optical fiber while, on the other hand, the divergent portion 203 is provided such that it gradually increases in diameter from a boundary between itself and the positioning portion 202 toward the inlet 2b side of the fiber insertion hole and its diameter becomes maximum at the inlet 2b side of the fiber insertion hole.

Figure 5:
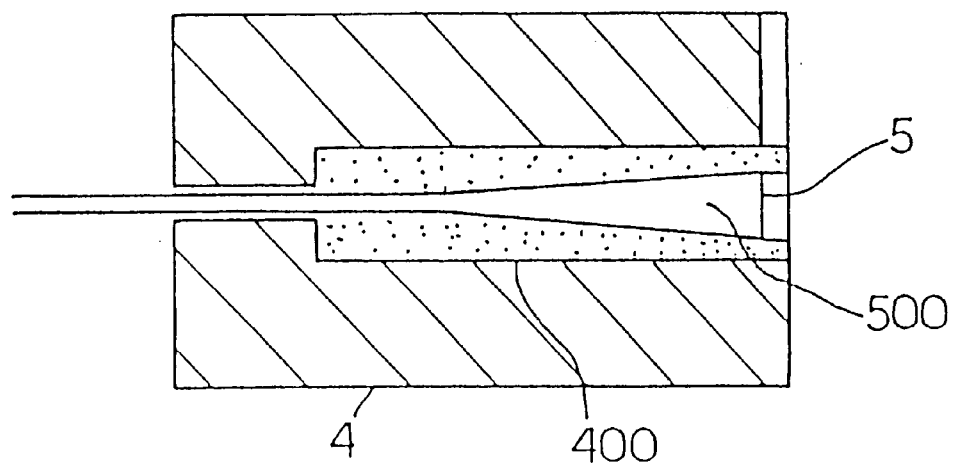
FIG. 5 is a view illustrating a method for manufacturing the ferrule illustrated in FIG. 4.

In order to fabricate this ferrule, there are used a die 4 and core pin 5 such as those illustrated in FIG. 5.

The die 4 is provided with a cavity 400 for forming the contour of the ferrule main body 1 while, on the other hand, an insertion hole configuration portion 5 having substantially the same configuration as that of the fiber insertion hole 2 is formed with respect to the core pin 5.

When manufacturing the ferrule using the above-mentioned die 4 and core pin 5, the core pin 5 is inserted into the cavity of the die 4 and the insertion hole configuration portion 500 of the core pin 5 is positioned and fixed at a predetermined position within the cavity 400, after which base material for ferrule is injected and filled into the cavity 400.

In the ferrule that has been prepared in the above-mentioned way, when inserting the elemental optical fiber into the fiber insertion hole 2 from the inlet 2b side thereof, the elemental optical fiber coheres onto the fiber insertion hole 2 in the positioning portion 202 and, through this coherence, positioning and fixing of the elemental optical fiber are performed.

In this ferrule of this embodiment form, the portion of the fiber insertion hole covering from the positioning portion 202 to the inlet 2b side of the fiber insertion hole 2 is made to diverge smoothly as the divergent portion 203. Therefore, when performing injection molding of the ferrule main body 1, blow holes or burrs are less likely to occur in the fiber insertion hole 2 and therefore it is possible to finish the positioning portion 202 into a desired configuration. As a result, positioning and fixing precision of the elemental optical fiber is improved while, on the other hand, the elemental optical fiber can be prevented from being flawed by the burrs produced. In these respects, it is possible to enhance the reliability of the optical communication. Also, the performance of the secondary machinings (burr removal machining, chamfering, circular-arc configuration chamfering, etc.) for preventing such flawing can be omitted with the result that insertion of the elemental optical fiber into the fiber insertion hole 2 becomes possible without performing such secondary machinings. In this respect, the simplification of the manufacturing process steps for the ferrule, the reduction in the manufacturing time length therefor, the reduction in the manufacturing cost therefor, etc. can also be achieved.

In this ferrule, only the large-depth 2a side alone of the fiber insertion hole 2 is formed as the positioning portion 202. For this reason, the finish-machining for positioning and fixing of the elemental optical fiber is only needed to be done not with respect to the fiber insertion hole as a whole but with respect to the positioning portion 202 alone. Therefore, the finish machining quantity and time length decreases. In this respect also, the manufacturing time length for the ferrule and the manufacturing cost therefor can be reduced.

Also, in this ferrule, only the positioning portion 202 alone of the fiber insertion hole 2 is made small in diameter. For this reason, not the whole but part of the fiber insertion hole 2 is small in diameter and the length of the small-diameter hole is short. Therefore, at a time of, for example, the injection molding of the ferrule main body 1, the curving of the fiber insertion hole 2 is minimized. Accordingly, the process steps for correcting such curving can be omitted to thereby simplify the manufacturing process steps for the ferrule. In this respect also, the reduction in the manufacturing time length for the ferrule and in the manufacturing cost therefor can be achieved.

Figure 6:
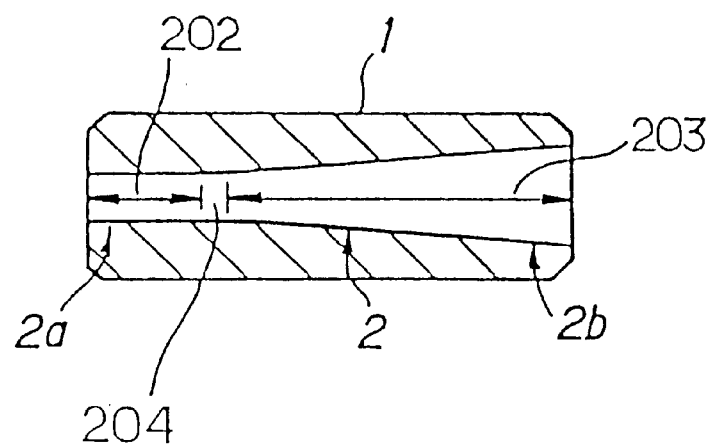
FIG. 6 is a sectional view illustrating another embodiment form of the ferrule according to the present invention.

It is to be noted that the manner of divergence of the divergent portion 203 can be also made not curvilinear but linear as illustrated in FIG. 6. In this case, connecting the divergent portion 203 and the positioning portion 202 by means of a curved surface, that is, providing a non-angled curved surface portion 204 at a boundary between the portions 203 and 202 is preferable because no catch, flaw, etc. occur when performing fiber insertion.

FIG. 7 illustrates a ferrule manufacturing method according to an embodiment of the present invention. The ferrule manufacturing method illustrated in this figure comprises the process steps 100 to 104.

Figure 8A:
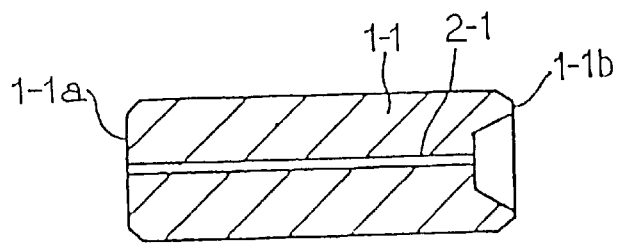
FIG. 8(a)–8(f) are views illustrating details of the manufacturing method illustrated in FIG. 7.

In a process step (molding) 100, molding is performed of the ferrule blank 1—3 having a configuration such as that illustrated in FIG. 8(a). It is to be noted that since the configuration of the ferrule blank 1—3, a method for molding thereof, etc. are the same as in the prior art and therefore a detailed description thereof is omitted.

Figure 8B:
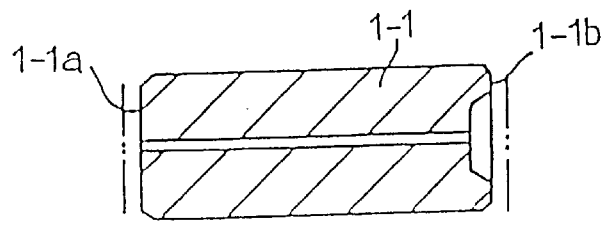

In a process step (end face rough grinding) 101, after molding of the ferrule blank, rough grinding is performed of the both end faces 1-1a, 1-1b of a ferrule blank 1—3 (refer to FIG. 8(b)).

Figure 8C:
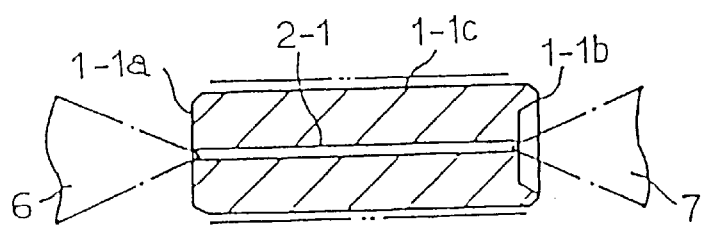

In a process step (outside diameter rough grinding [both-center method]) 102, as illustrated in FIG. 8(c), rough grinding is performed of the outside diameter portion 1-1c of the ferrule blank 1—3, thereby removing the eccentricity (that has occurred at the stage of molding the ferrule blank 1—3) between the outside diameter of the ferrule blank 1—3 and the prepared hole 2-1 thereof and thereby making the outside diameter of the ferrule blank 11 and the prepared hole 2-1 thereof coaxial.

In this outside diameter rough grinding, the ferrule blank 1—3 is supported by the both-center supporting method. The both-center supporting is performed by causing the centers 6 and 7 to abut against the prepared hole 2-1 from the both end face sides I-1a and 1-1b of the ferrule blank 1—3 and thereby causing the ferrule blank 1—3 to be supported from the both end faces 1-1a and 1-1b sides.

Figure 8D:
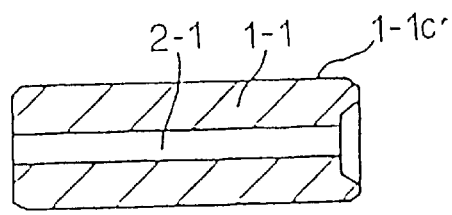

In a process step (inside diameter polishing) 103, the prepared hole 2-1 is polished with regard to the ferrule blank 1—3 whose eccentricity has already been zeroed (refer to FIG. 8(d)).

In this inside diameter polishing, a cylindrical type holder 9 having a configuration such as that illustrated in FIG. 9 is used as a polishing jig. One end side of the cylindrical type holder 9 is made open as a blank insertion inlet 900 and the other end side thereof is made open as a scattered abrasive grains insertion opening 901. Also, the inside of the trunk portion of the cylindrical type holder 9 is formed as a blank setting portion 902. The inside diameter of the blank setting portion 902 is made slightly larger on the micron order than the outside diameter of the eccentricity-zeroed ferrule blank 1—3.

When inserting the eccentricity-zeroed ferrule blank 1—3, 1—3, - - - one at a time from the blank insertion opening 900 side of the cylindrical type holder 9 into the blank setting portion 902, these ferrule blanks 1—3, 1—3, - - - abut against the interior of the cylindrical type holder 9 and are positioned and fixed consecutively in a row and, by inserting a screw 903 into the blank insertion opening 900 and mounting it thereon, are pressed and fixed to the scattered abrasive grains insertion opening 901 side.

That is, in the process step 103, when performing the inside diameter polishing, a plurality of the eccentricity-zeroed ferrule blanks 1—3, 1—3, - - - are made beforehand to abut against the interior of the cylindrical type holder 9 and are positioned and fixed consecutively in one row. Thereafter, a polishing taper wire 12 and scattered abrasive grains 10 are inserted from the end face side of the cylindrical type holder 9 into the prepared holes 2-1, 2-1, - - - of the ferrule blanks 1—3, 1—3, - - - -. As a result, with the outside diameter of the ferrule blank 1—3 being used as a machining basis, each of the prepared holes 2-1, 2-1, - - - is polished simultaneously. It is to be noted that the taper wire 12 is inserted through the scattered abrasive grains insertion opening 901.

In a process step (end face finish-grinding) 104, usually, the end face 1-1a is very often demanded to be finished into a convex spherical surface. Therefore, the end face 1-1a of the ferrule blank 1—3 is machined into a convex spherical surface or the like (refer to FIG. 8(f)).

In the ferrule manufacturing method of this embodiment form, when performing the prepared hole polishing, the eccentricity-zeroed ferrule blanks 1—3, 1—3, - - - are positioned and fixed not with the use of adhesive but with only a simple one-touch operation of causing mere abutment thereof against the cylindrical type holder 9. For this reason, the use of adhesive in the ferrule manufacturing process step can be abolished. This enables the omission of the tooling operation that is time-consuming and makes the omission of use of man power difficult, such as an adhesive charging and setting or adhesive removing operation. This enables reduction in the ferrule manufacturing time length and in addition makes this method suitable for achieving full-automation of the ferrule manufacturing process steps.

In addition, according to the ferrule manufacturing method, since the positioning and fixing of the ferrule blanks 1—3, 1—3, - - - are effected through the abutment thereof against the interior of the cylindrical type holder 9, it happens neither that the set condition of the ferrule blanks 1—3, 1—3, - - - within the cylindrical type holder 9 collapses nor that the ferrule blanks 1—3, 1—3, - - - are inclined or tilted to fall down. For this reason, the set precision and the balance of the cylindrical type holder 9 are excellent and therefore the prepared holes 2-1, 2-1, - - - can be polished under good machining conditions. As a result, the machining precision such as the parallelism precision, eccentricity precision, etc. of the prepared holes 2-1, 2-1, - - - with respect to the outside diameter of the ferrule blanks is increased and also the high-speed rotation of the cylindrical type holder 9 becomes possible with the result that the machining efficiency also becomes high.

Especially, in this ferrule manufacturing method, polishing and fixing of the ferrule blanks 1—3, 1—3, - - - are performed using the wireless method in which the ferrule blanks 1—3, 1—3, - - - are merely made to cause the ferrule blanks 1—3, 1—3, - - - to directly abut against the interior of the cylindrical type holder 9. Therefore, even the ferrule blank whose set precision is bad when merely performing the polishing and fixing that uses the wire as in the prior art, such as the ferrule blank whose prepared hole 2-1 is in the form of a nozzle whose forward end is small in diameter, can be set with a high precision in parallel with the cylindrical type holder 9, whereby the enhancement of the machining precision can be achieved.

In this ferrule manufacturing method, prior to the polishing of the prepared hole 2-1, the outside diameter grinding is performed previously to thereby zero the eccentricity between the outside diameter of the ferrule blank 1—3 and the prepared hole 2-1 thereof. Therefore, there is no need to newly provide the process step for removing the eccentricity after the polishing of the prepared hole 2-1 as in the prior art, whereby the simplification of the process steps can be achieved.

When there is the necessity of suppressing the eccentricity to a very small value, in order to correct the amount of the eccentricity deteriorated due to the inside diameter polishing after the performance of the process step 103 (inside diameter polishing), it is also effective to perform the outside diameter finish-grinding. When performing this outside diameter finish-grinding, it is suitable to use the both-center supporting method that is used in the process step 102.

The means for pressing and fixing the ferrule blanks 1—3, 1—3, - - - to the scattered abrasive grain insertion opening 901 side is not limited to the insertion and mounting of the screw 903 into the blank insertion opening 900. For example, as illustrated in FIGS. 10(a) and 10(b), part of the ferrule blank 1—3 is made to protrude from the blank insertion opening 900 into outside this opening 900, whereby a pressure plate 10 may be screwed to the cylindrical type holder 9 from the protruding-end side of the ferrule blank 1—3.

Figure 11:
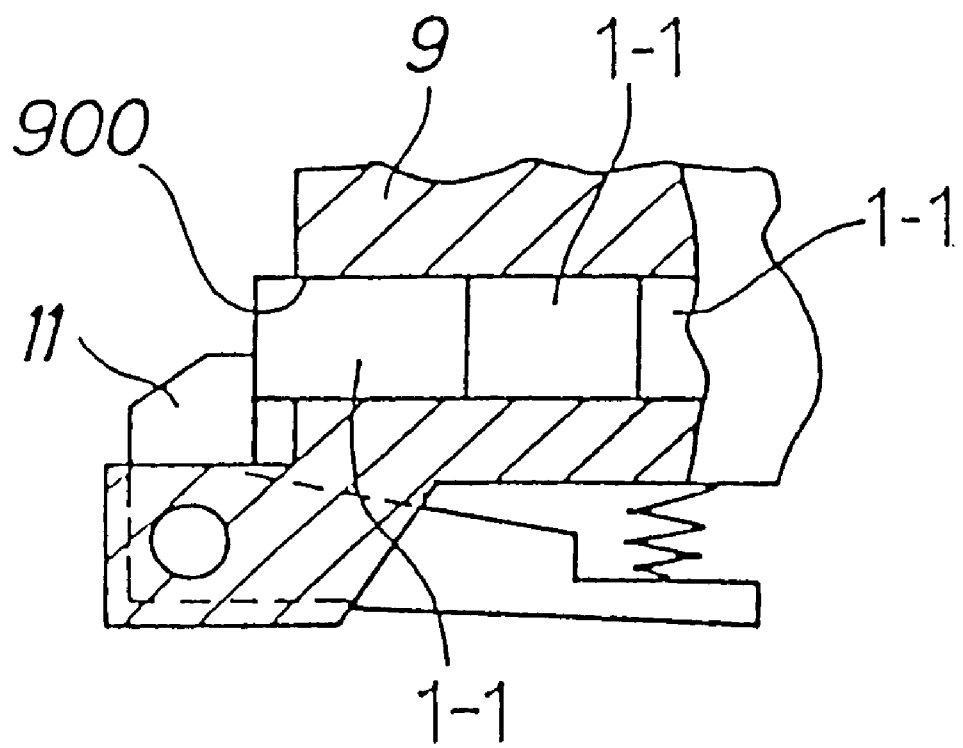
FIG. 11 is a sectional view illustrating another embodiment form of the cylindrical type holder.

Also, the pressing and fixing means may be constructed using not the screw but a claw 11 such as that illustrated in FIG. 11. In this case, the claw 11 is provided on the blank insertion opening 900 side of the cylindrical type holder 9 and, by a spring force or the like, the ferrule blanks 1—3, 1—3, - - - can be pressed from the end face side toward the scattered abrasive grains insertion opening 901 side.

Regarding the cylindrical type holder 9, a plurality of vertical slits such as those of a collet may be provided, whereby the holder 9 may be made radially openable and closable by the use of these slits. In the cylindrical type holder that is openable and closable in such a way, when the holder is closed, it abuts against the ferrule blank and can thereby effect positioning and fixing thereof.

Figure 12:
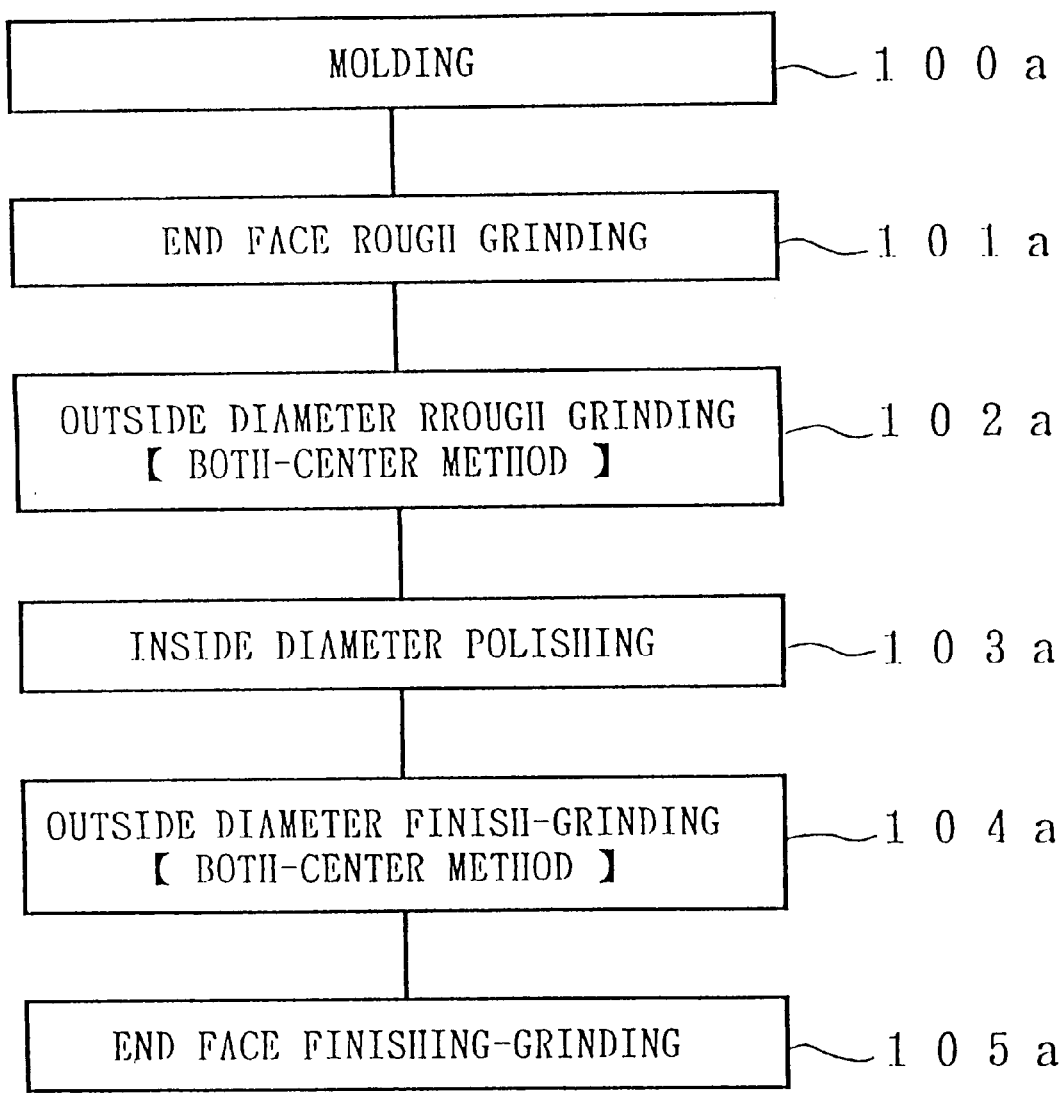
FIG. 12 is a flow chart illustrating another embodiment form of the ferrule manufacturing method according to the present invention.
Figure 13:
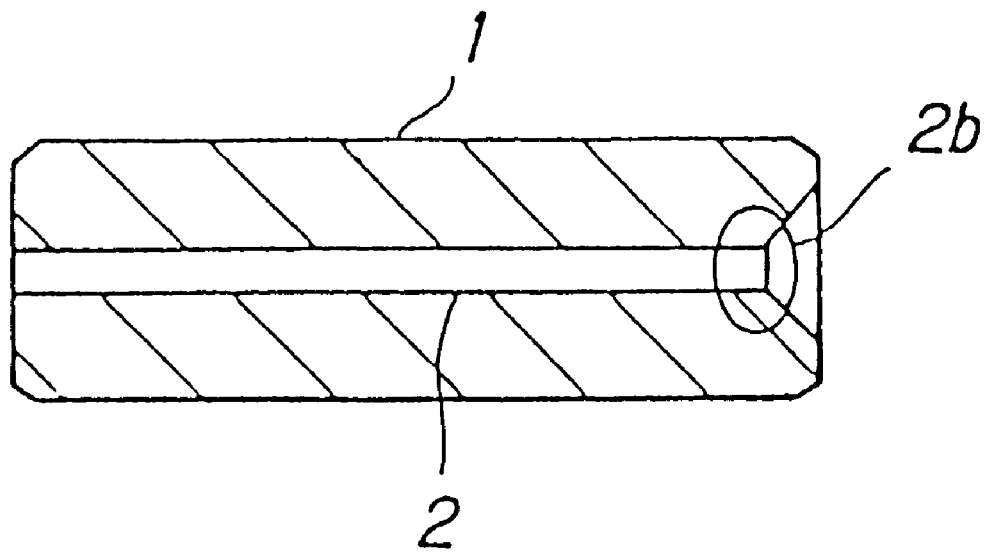
FIG. 13 is a sectional view illustrating a conventional ferrule.
Figure 14:
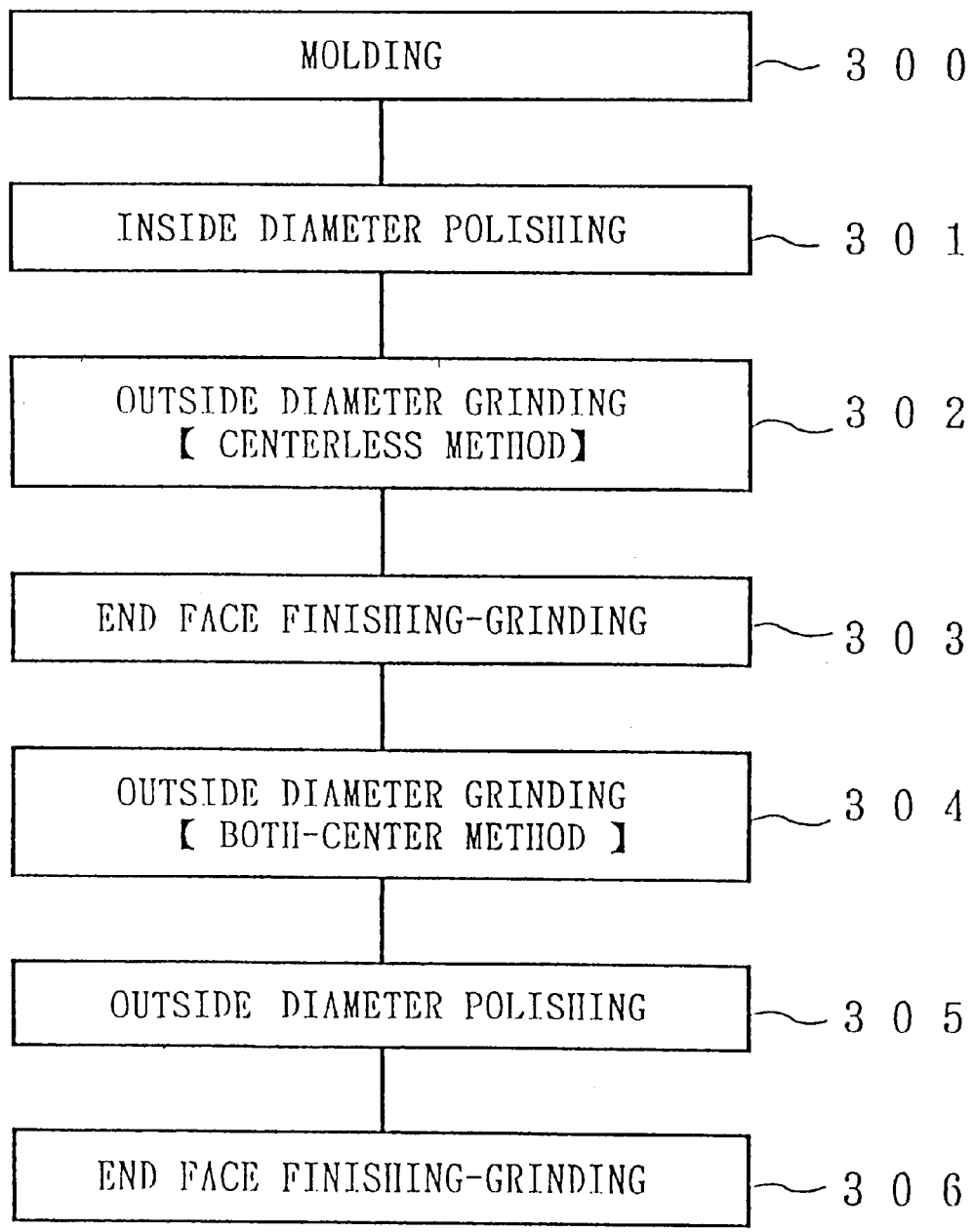
FIG. 14 is a flow chart illustrating a conventional ferrule manufacturing method.
Figure 15:
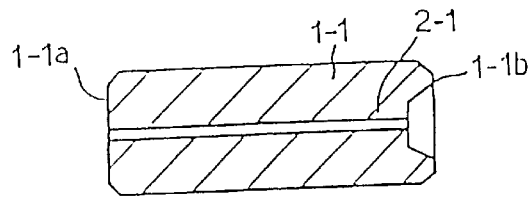
FIGS. 15(a)–15(g) are views illustrating details of the manufacturing process steps illustrated in FIG. 14.
Figure 15:
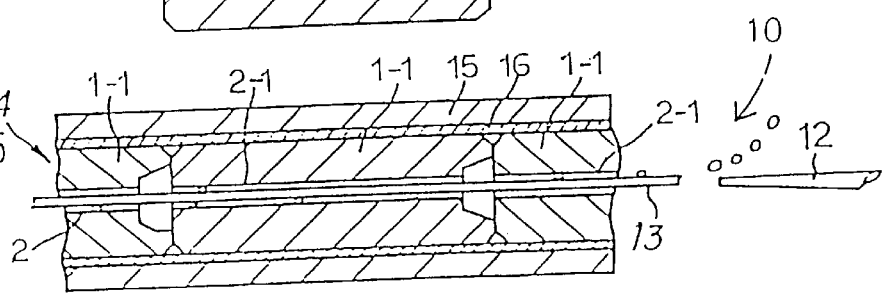
Figure 15:
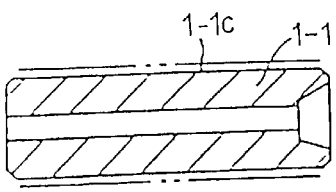
Figure 15:
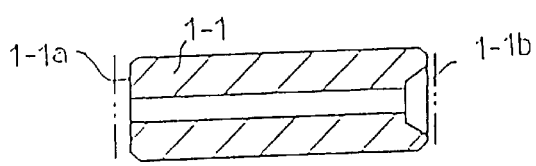
Figure 15:
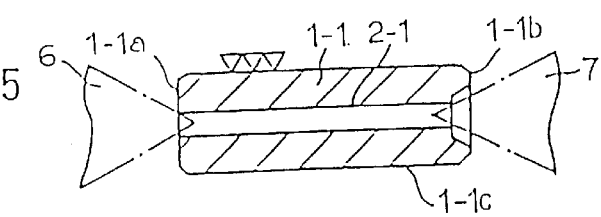
Figure 15:
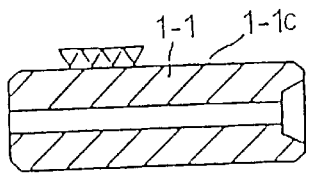
Figure 15:
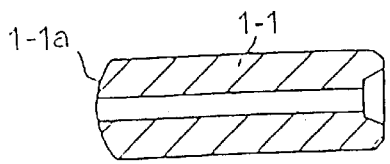
Figure 18:
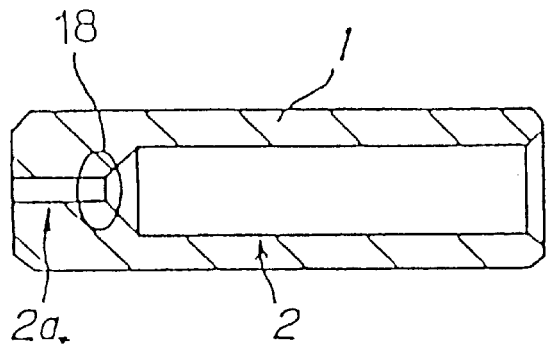
FIG. 18 is a sectional view illustrating another conventional ferrule.
Figure 19A:
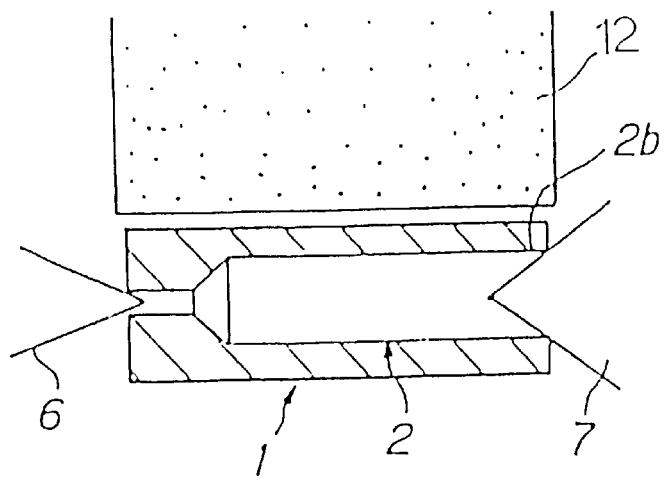
FIGS. 19(a) and 19(b) are views illustrating a conventional ferrule manufacturing method. And, FIG. 20 is a view illustrating a conventional ferrule manufacturing method.
Figure 19B:
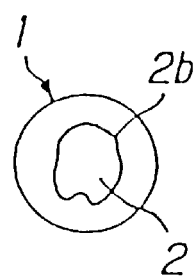
Figure 20:
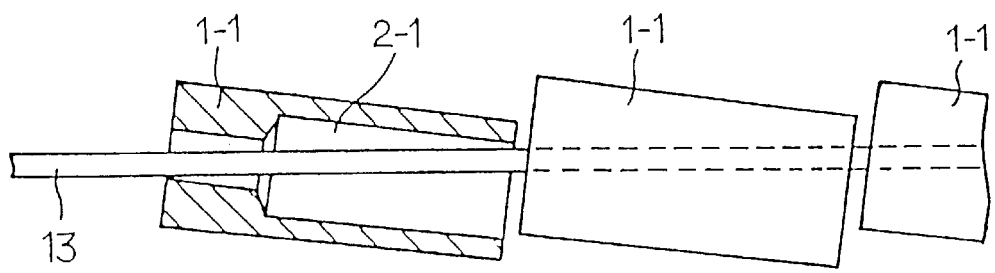

FIG. 12 illustrates another embodiment form of the ferrule manufacturing method according to the present invention. The ferrule manufacturing method illustrated in this figure comprises process steps 100a to 105a, a detail of which will now be explained next with reference to FIG. 8.

In a process step (molding) 100a, the ferrule blank 1—3 having a configuration such as that illustrated in FIG. 8(a) is molded. It is to be noted that since the configuration of the ferrule blank 1—3, method of molding thereof, etc. are the same as those in the prior art, a detailed explanation thereof is omitted.

In a process step (end face rough grinding) 101a, after molding of the ferrule blank, rough grinding is performed of the both end face 1-1a and 1-1b side of the ferrule blank 1—3 (refer to FIG. 8(b)). Since the grinding method is the same as in the prior art, a detailed explanation is omitted.

In a process step (outside diameter rough grinding [both-center method]) 102a, as illustrated in FIG. 8(c), rough grinding is performed of the outside diameter portion 1-1a of the ferrule blank. In this outside diameter rough grinding, the ferrule blank 1—3 is supported by the both-center supporting method. The both-center supporting method is performed by causing the centers 6 and 7 to abut against the prepared hole 2-1 from the both end face 1-1a and 1-1b sides of the ferrule blank 1—3 and thereby causing the ferrule blank 1—3 to be supported from the both end faces 1-1a and 1-1b sides.

That is, in the process step 102a, from the standpoint of making the outside diameter of the ferrule blank 1—3 and the prepared hole 2-1 coaxial, prior to the polishing of the prepared hole 2-1, the outside diameter rough grinding is performed beforehand with the use of the both-center supporting method to thereby zero the eccentricity and inclination of the outside diameter of the ferrule blank 1—3 with respect to the prepared hole 2-1.

In a process step (inside diameter polishing) 103a, as illustrated in FIG. 8(d), the prepared hole 2-1 is polished regarding the ferrule blank 1—3 on which the outside diameter rough grinding is ended. This inside diameter polishing is performed using the outside diameter of the ferrule blank 1—3 as a basis, namely, while the outside diameter portion 1-3c of the ferrule blank 1—3 is being supported.

Figure 8E:
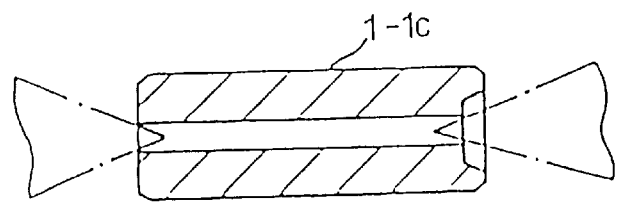

In a process step (outside diameter finish-grinding [both-center method]) 104a, as illustrated in FIG. 8(e), the finish-grinding is performed on the outside diameter portion 1-1c of the ferrule blank 1—3. When performing the finish-grinding of the outside diameter, the ferrule blank 1—3 is supported by the both-center supporting method. It is to be noted that since the both-center supporting is performed in the same way as in the case of the process step 102a, a detailed explanation thereof is omitted.

Figure 8F:
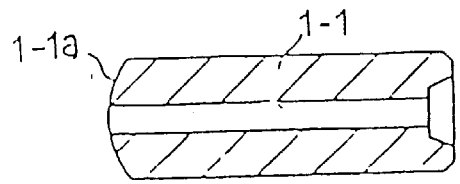

In a process step 105a (end face finish-grinding), machining is performed such as that of forming the end face 1-1a of the ferrule blank 1—3 into a spherical surface (refer to FIG. 8(f)).

In the ferrule manufacturing method of this embodiment form, prior to polishing of the prepared hole 2-1, the eccentricity and inclination of the outside diameter of the ferrule blank with respect to the prepared hole 2-1 are removed beforehand by performing the outside diameter grinding. For this reason, when providing the outside diameter machining allowance of the ferrule blank 1—3, since it is only needed to take into consideration the eccentricity and inclination that result from the molding errors that occur at the stage of molding (process step 100a) the ferrule blank 1—3, it is possible to minimize the outside diameter machining allowance and therefore to reduce the amount of molding material of the ferrule blank 1—3 by that extent and therefore to manufacture the ferrule in a smaller amount of material and at a lower cost.

According to this ferrule manufacturing method, since the outside diameter machining allowance becomes smaller in amount as mentioned above, it is also possible to decrease time length needed for the performance of the outside diameter grinding. In this respect, it is possible to shorten the ferrule manufacturing time length.

Also, in this ferrule manufacturing method, the entire step for the outside diameter grinding is performed by the both-center method. This eliminates the necessity of performing the tooling operation that makes the omission of man power difficult and necessitates the use of a large time length and is difficult to perform with a high precision, such as the wire setting operation of performing wire setting with respect to the ferrule blank in the wire centerless method. Therefore, this manufacturing method is suitable for achieving the automation of the ferrule manufacturing process steps and the enhancement of the machining precision. Regarding the prepared hole of a nozzle configuration in particular, this manufacturing method is suitable for procurement of a desired machining precision.

It is to be noted that the end face rough grinding in the process step 101a and the end face finish-grinding in the process step 105a can also be both performed before the outside diameter rough grinding (process step 102a) or after the outside diameter finish-grinding (process step 104a).

In the present invention, at least the three protruding portions are provided on the inner wall at the other end of the fiber insertion hole and these protruding portions are used as the abutment bases for abutment of the center at a time of the ferrule outside diameter grinding. For this reason, when performing the outside diameter grinding of the ferrule, the center jig abuts not against the hole inlet which is as is immediately after injection molding and whose contour has concavities and convexities but against the protruding portions that serve as the abutment bases. Therefore, the state of contact of the center jig becomes stable with the result that the outside diameter grinding precision increases and therefore a high precision optical fiber connector is obtained.

According to the present invention, after injection molding, even if no machining is performed on the ferrule that is prior to the performance of the outside diameter grinding thereof, the 3-point contact between the center jig and the protruding portions is reliably obtained through the abutment therebetween. For this reason, it is not needed to finish the other end of the fiber insertion hole to a desired dimensional precision before the performance of the outside diameter grinding and it is therefore possible to omit the performance of the center hole machining for finishing this other end of the fiber insertion hole. This means that the ferrule manufacturing process steps decrease in number by that extent. In this respect, it is possible to achieve the simplification of the manufacturing process steps for manufacturing the optical fiber connector and the reduction in the manufacturing cost therefor.

According to the present invention, the protruding portions such as those mentioned above are formed into a spherical configuration. For this reason, even if the protruding portions are made to remain as are, the elemental optical fiber is prevented from being flawed by such protruding portions in the succeeding process steps. This enables the omission of the secondary machinings for achieving the prevention of the flaws. In this respect also, the simplification of the manufacturing process steps and the decrease in the manufacturing cost can be achieved.

Also, in the present invention, the portion of the fiber insertion hole that covers from the positioning portion to the inlet side thereof is made to smoothly diverge as the divergent portion. For this reason, at a time of, for example, injection molding of the ferrule main body, blow holes or burrs are less likely to occur in the fiber insertion hole. As a result, the positioning portion can be finished to a desired configuration, with the result that the positioning and fixing precision of the elemental optical fiber increases. Also, the elemental optical fiber is prevented from being flawed due to the burrs. In these respects, the reliability of the optical communication can be enhanced and therefore the present invention is suitable for performing highly reliable optical communication. Also, since the secondary machinings for preventing such flawing can be omitted and therefore with no secondary machinings being performed the insertion of the elemental optical fiber into the fiber insertion hole becomes possible, the simplification of the ferrule manufacturing process steps, the decrease in the manufacturing time length, the reduction in the manufacturing cost, etc. can be achieved.

According to the present invention, only the large-depth portion side alone of the fiber insertion hole is formed as the positioning portion. For this reason, the finish-machining for positioning and fixing of the elemental optical fiber is only required to be performed with respect not to the whole fiber insertion hole but to the positioning portion alone. As a result, the amount of finish-machining as well as the time length of machining decreases. In this respect also, the decrease in the ferrule manufacturing time length and the reduction in the manufacturing cost can be achieved.

According to the present invention, only the positioning portion alone of the fiber insertion hole is made small in diameter. For this reason, not the whole but part of the fiber insertion hole is made small in diameter with the result that the length of the small-diameter hole is small. Therefore, at a time of, for example, injection molding of the ferrule main body, the curving of the fiber insertion hole is minimized. Accordingly, the process step for correcting such curving can be omitted. In this respect also, the simplification of the ferrule manufacturing process steps, the decrease in the manufacturing time length and the reduction in the manufacturing cost can be achieved.

Also, in the present invention, when performing the polishing of the prepared hole, the eccentricity-zeroed ferrule blank is positioned and fixed not with the use of adhesive but with a simple one touch operation of causing mere abutment thereof against the cylindrical type holder. For this reason, the use of adhesive in the ferrule manufacturing process steps can be abolished with the result that the artificial and time-consuming tooling operation involved in the use of adhesive can be omitted. Therefore, the present invention is suitable for making up of a fully automated manufacturing system which is directed to shortening the ferrule manufacturing time length and fully automating the ferrule manufacturing process steps to thereby reduce and omit the man power.

According to the present invention, the positioning and fixing of the ferrule blank are performed through the abutment of the ferrule blank against the cylindrical holder. For this reason, it happens neither that the set condition of the ferrule blank collapses within the cylindrical type holder nor that the ferrule blank within it is inclined to fall down, whereupon the set precision as well as the balance of the cylindrical type holder is excellent. Therefore, it is possible to polish the prepared hole under the excellent machining conditions. As a result, the machining precision is improved while, on the other hand, high-speed rotation of the cylindrical type holder becomes possible and also the machining efficiency is improved.

In the present invention, the positioning and fixing of the ferrule blank are performed with the wireless method of merely causing the ferrule blank to abut directly against the interior of the cylindrical type holder. For this reason, even the ferrule blank whose set precision is inferior when positioned and fixed using a wire as in the prior art, such as the ferrule blank whose prepared hole is in the form of a nozzle whose forward end is small in diameter, can be set with a high precision in parallel with the cylindrical type holder, with the result that the machining precision can be improved.

Also, according to the present invention, prior to the polishing of the prepared hole, the eccentricity between the outside diameter of the ferrule blank and the prepared hole thereof is zeroed beforehand by the grinding of the outside diameter. For this reason, firstly, there is no need to provide the process step for newly zeroing the eccentricity after polishing of the prepared hole as in the prior art. Therefore, the simplification of the process steps can be achieved in the respect of enabling the omission of such process step. Secondly, when providing the outside diameter machining allowance of the ferrule blank, it is only needed to take into consideration the eccentricity and inclination which result from the molding errors that occur at the stage of molding the ferrule blank. As a result, the outside diameter machining allowance can be miniaturized. Therefore, the molding material of the ferrule blank and the time length needed for grinding of the outside diameter can be decreased by that extent. Accordingly, the present invention is suitable for achieving the cost reduction of this type of ferrule, the decrease in the manufacturing time length, etc.

According to the present invention, since the entire outside diameter grinding is performed with the use of the both-center method, there is performed no tooling operation that makes it difficult to omit the use of man power, necessitates the use of a large length of time and is difficult to perform with a high precision, such as the operation of performing wire setting of the ferrule blank with the use of the wire centerless method. As a result, it is possible to achieve the automation of the ferrule manufacturing process steps and the enhancement of the machining precision.

What is claimed is:

1. A ferrule for use in an optical fiber connector, the ferrule comprising: a main body having a first end portion, a second end portion, a generally cylindrical-shaped outer peripheral surface having a uniform diameter and extending from the first end portion to the second end portion, and a fiber insertion hole for insertion therein of an optical fiber, the fiber insertion hole having a predetermined length, a first end for receiving the optical fiber, a second end, a positioning portion disposed proximate the second end for connection to an outer peripheral surface of the optical fiber to position the optical fiber in the fiber insertion hole, and a divergent portion diverging smoothly from the positioning portion to the first end.

2. A ferrule as claimed in claim 3; wherein the divergent portion extends along a greater length of the fiber insertion hole than the positioning portion.

3. A ferrule as claimed in claim 3; wherein the fiber insertion hole comprises a central throughbore.

4. A ferrule as claimed in claim 3; wherein the outer peripheral surface of the main body comprises a ground surface.

5. A ferrule as claimed in claim 4; wherein the ground surface is not threaded.

6. A ferrule as claimed in claim 1; wherein the positioning portion of the fiber insertion hole has a polished surface for connection to the outer peripheral surface of the optical fiber.

7. A ferrule as claimed in claim 1; wherein each of the first and second end portions of the main body comprises a peripheral flange.

8. A ferrule as claimed in claim 1; wherein the positioning portion of the fiber insertion hole has a uniform diameter.

9. A ferrule as claimed in claim 1; wherein the divergent portion of the fiber insertion hole is curvilinear.

10. A ferrule as claimed in claim 1; wherein the divergent portion of the fiber insertion hole is linear.

11. A ferrule as claimed in claim 10; wherein the fiber insertion hole has a curved surface portion connecting the positioning portion to the divergent portion.

12. A ferrule comprising: a main body having a first end portion, a second end portion, a generally cylindrical-shaped outer peripheral surface having a uniform diameter and extending from the first end portion to the second end portion, and a through-bore extending therethrough for receiving an optical fiber element, the through-bore having a predetermined length, an open end for receiving the optical fiber element, a first section extending along a first length portion of the through-bore for fixing and positioning the optical fiber element, and a second section having a diameter greater than a diameter of the first section and extending along a second length portion of the through-bore which is greater than the first length portion, the second section diverging smoothly from the first section to the open end.

13. A ferrule as claimed in claim 12; wherein the through-bore has a central axis extending through a center of the main body.

14. A ferrule as claimed in claim 12; wherein the outer peripheral surface of the main body comprises a ground surface.

15. A ferrule as claimed in claim 14; wherein the ground surface is not threaded.

16. A ferrule as claimed in claim 12; wherein the first section of the through-bore has a polished surface for fixing and positioning the optical fiber element.

17. A ferrule as claimed in claim 12; wherein each of the first and second end portions of the main body comprises a peripheral flange.

18. A ferrule as claimed in claim 12; wherein the first section of the through-bore has a uniform diameter.

19. A ferrule as claimed in claim 12; wherein the second section of the through-bore is curvilinear.

20. A ferrule as claimed in claim 12; wherein the second section of the through-bore is linear.

21. A ferrule as claimed in claim 12; wherein the through-bore has a curved surface portion connecting the first section to the second section.

22. A ferrule comprising: a main body having a fiber insertion hole for insertion therein of an optical fiber, the fiber insertion hole having a first end for receiving the optical fiber, a second end, a positioning portion having a uniform diameter and disposed proximate the second end for connection to an outer peripheral surface of the optical fiber to position the optical fiber in the fiber insertion hole, and a divergent portion diverging from a position proximate the positioning portion to the first end.

23. A ferrule as claimed in claim 22; wherein the divergent portion is curvilinear and diverges smoothly from the positioning portion to the first end.

24. A ferrule as claimed in claim 22; wherein the divergent portion is linear; and wherein the fiber insertion hole has a curved portion connecting the positioning portion to the divergent portion, the divergent portion diverging from the curved portion to the first end.

* * * * *